United States Patent [19]

Takayama

[11] Patent Number: 4,766,485

[45] Date of Patent: Aug. 23, 1988

[54] COLOR-DIFFERENCE LINE-SEQUENCE SIGNAL PROCESSING APPARATUS

[75] Inventor: Makoto Takayama, Kanagawa, Japan

[73] Assignee: Canon Kabushiki Kaisha, Tokyo, Japan

[21] Appl. No.: 894,129

[22] Filed: Aug. 7, 1986

[30] Foreign Application Priority Data

Aug. 7, 1986 [JP] Japan .................................. 60-172434

[51] Int. Cl.⁴ .......................... H04N 1/46; H04N 9/71
[52] U.S. Cl. ........................................ 358/34; 358/75; 358/909
[58] Field of Search .................. 358/34, 171, 909, 174, 358/176, 75; 330/11

[56] References Cited

U.S. PATENT DOCUMENTS 4,056,826  11/1977  Watanabe et al. ..................... 358/19
4,369,466  1/1983  Matsuzaki et al. ................... 358/171
4,403,254  9/1983  Okada et al. ......................... 358/171
4,651,213  3/1987  Takimoto ............................. 358/171

FOREIGN PATENT DOCUMENTS 56-75780  6/1981  Japan ..................................... 358/34

Primary Examiner—James J. Groody
Assistant Examiner—Robert M. Bauer
Attorney, Agent, or Firm—Robin, Blecker & Daley

[57] ABSTRACT

Apparatus is disclosed for processing an incoming video signal having line sequential R-Y and B-Y color difference signals at respective different DC offsets. The apparatus includes first and second memory circuits for receiving the incoming signal and for respective storage of the offsets of the R-Y and B-Y color difference signals. A computing circuit is operative selectively to subtract the contents of the first and second memory circuits from the incoming signal line sequence parts to provide offset-free versions thereof.

11 Claims, 3 Drawing Sheets

B − Y      R − Y      B − Y      R − Y

B − Y      R − Y      B − Y      R − Y

019## COLOR-DIFFERENCE LINE-SEQUENCE SIGNAL PROCESSING APPARATUS

BACKGROUND OF THE INVENTION

1. Field of the Invention

This invention relates to devices for processing offset-cum-signals such as video signals.

2. Description of the Related Art

In the still video apparatus, for example, the signal is processed so that the luminance signal and color signal are recorded in superimposed relation. In this case, the R-Y and B-Y signals as the color difference signals are recorded in the form of a line-sequence signal. In order to discriminate between the (R-Y) and (B-Y) signals, a DC offset for each line is added to this line-sequence signal.

For this reason, the still video apparatus necessitates a circuit for depriving the offset-contained color difference signals of the offset when during reproduction.

The mode of processing such color difference signals will be explained by reference to FIGS. 1a and 1b. FIG. 1a shows the reproduced signal of the still video apparatus, where the R-Y signal and the B-Y signal form the line-sequence signal having the offset. Such signal is converted to a line-sequence signal having no offset shown in FIG. 1b by passing it through a circuit performing offset removal.

In the past, such an offset removal has been realized by the circuit shown in FIG. 2.

In FIG. 2, the offset-cum-color difference line-sequence signal 1 such as that shown in FIG. 1a is applied to each of clamp circuits 2 and 3 which perform clamping during the horizontal blanking period. For example, 2 is made the clamp circuit for the R-Y signal, 3 is made the clamp circuit for the B-Y signal, and the potentials at the clamp points are made so as to be the same. Therefore, the blanking level of the R-Y signal produced from the clamp circuit 2 and the blanking level of the B-Y signal produced from the clamp circuit 3 become the same potential, and an offset-free color difference line-sequence signal 5 is obtained through a switching circuit 4 for changing over between the R-Y signal from the clamp circuit 2 and B-Y signal from the clamp circuit 3.

In such an offset removing circuit, however, the characteristics of the clamp circuit 2 and the clamp circuit 3 must be identical to each other. Otherwise, it would be difficult to assure removal of the offset. Also, adjustment for equalizing the characteristics of the clamp circuits must be made.

SUMMARY OF THE INVENTION

It is, therefore, a main object of the present invention to eliminate the above-described problem. To achieve this, in an embodiment of the invention, there are provided offset level holding means for holding the offset level of the signal having the offset, and adding means for obtaining the difference between the offset level in the holding means and the signal having the offset.

According to such an embodiment of the invention, an offset-free signal can be obtained by taking out the difference between the signal having the offset and the offset level, and the offset can be removed simply and with no adjustment.

Other objects and feature of the invention will become apparent from the following specification and drawings.

DETAILED DESCRIPTION OF THE PREFERRED EMBODIMENTS

Figure 3:
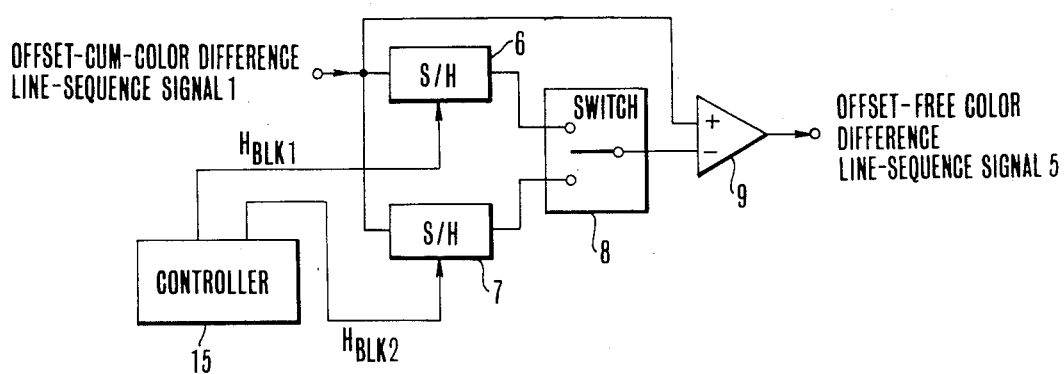
FIG. 3 is a diagram illustrating an embodiment of the invention.

FIG. 3 illustrates an embodiment of the invention.

As shown in FIG. 3, the offset-cum-color difference line-sequence signal 1 is applied to sample/hold circuits 6 and 7 as memory means, where during the horizontal blanking period, the offset level is sampled and that level is held. For example, 6 is made the sample/hold circuit for the R-Y signal, and 7 is made the sample/hold circuit for the B-Y signal. A controller 15 produces pulses $H_{BLK1}$, $H_{BLK2}$ for causing each sample/hold circuit to sample during the horizontal blanking period once for every two horizontal periods and, after that, hold this level for the two horizontal periods. The timings of sampling of the pulses $H_{BLK1}$ and $H_{BLK2}$ respectively supplied to the sample/hold circuits 6 and 7 are shifted one horizontal period from each other. Also, a switching circuit 8 applies the output of the sample/hold circuit 6 to a minus input terminal of an adder 9 when the offset-cum-color difference linesequence signal 1 is the R-Y signal, and applies the output of the sample/hold circuit 7 to the minus input terminal of the adder 9 when the offset-cum-color difference line-sequence signal is the B-Y signal.

Figure 1A:
FIGS. 1a and 1b are charts illustrating the mode of processing the color difference signals.
Figure 1B:
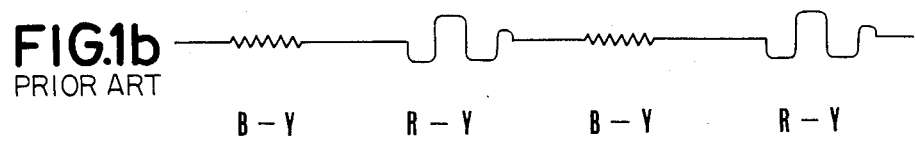
Figure 2:
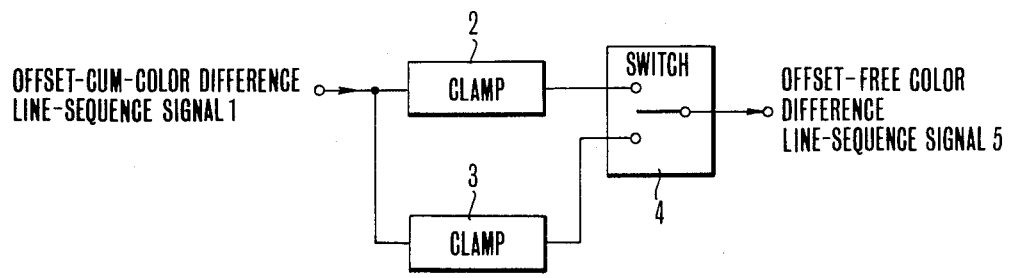
FIG. 2 is a block diagram illustrating an example of the conventional offset-cum-signal processing circuit.

Meanwhile, the offset-cum-color difference line-sequence signal 1 is applied to a plus input terminal of the adder 9. In the adder 9, therefore, the blanking level of the R-Y signal or B-Y signal, that is, the offset signal, is subtracted from the offset-cumcolor difference line-sequence signal 1. As a result, an offset-free color difference line-sequence signal 5 such as that shown in FIG. 1b is obtained from the adder 9.

For note, this embodiment has been described in connection with the analog signal processing apparatus for the purpose of simplifying explanation. But, the present invention can also be applied to a digital signal processing apparatus by substituting digital memories 10 and 11 as the memory means for the sample/hold circuits 6 and 7 respectively as shown in FIG. 4a.

Figure 4A:
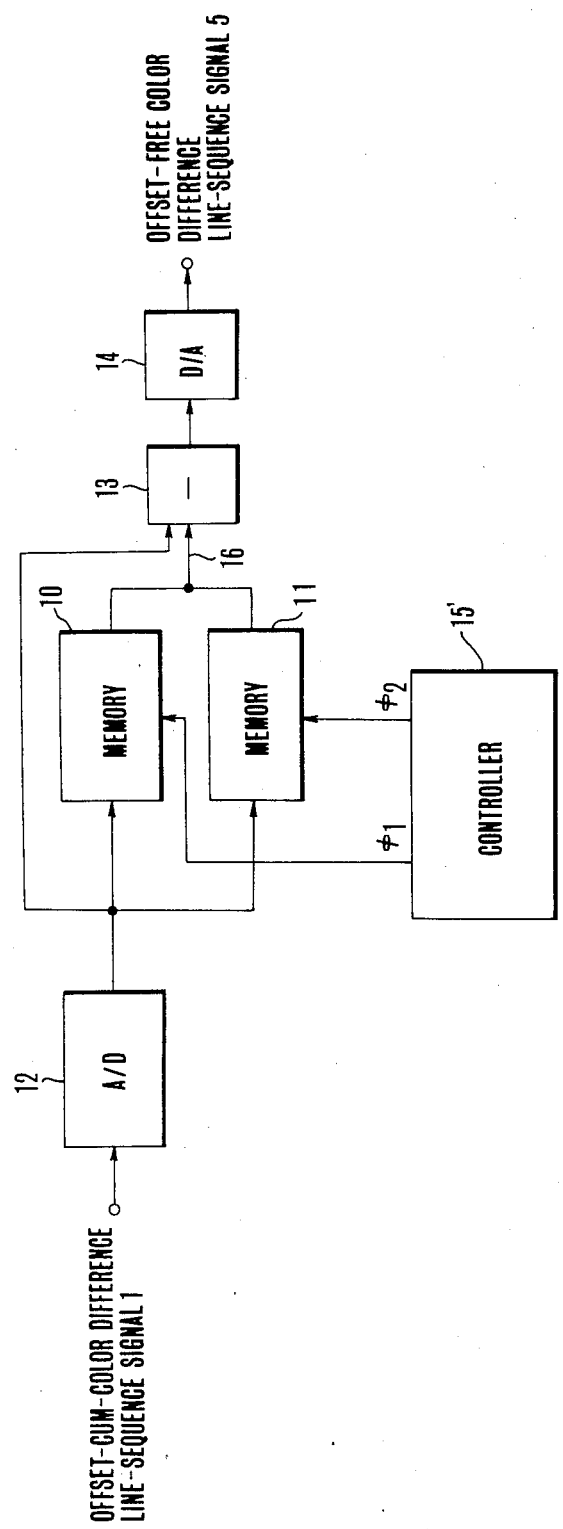
FIG. 4a is a diagram illustrating a second embodiment of the invention.

In FIG. 4a, 12 is an A/D converter; 13 is a subtraction circuit; 14 is a D/A converter; and 15' is a controller. The controller 15' produces such control signals $\phi_1$ and $\phi_2$ as shown in FIG. 4b in order to control the memories 10 and 11 respectively.

Figure 4B:
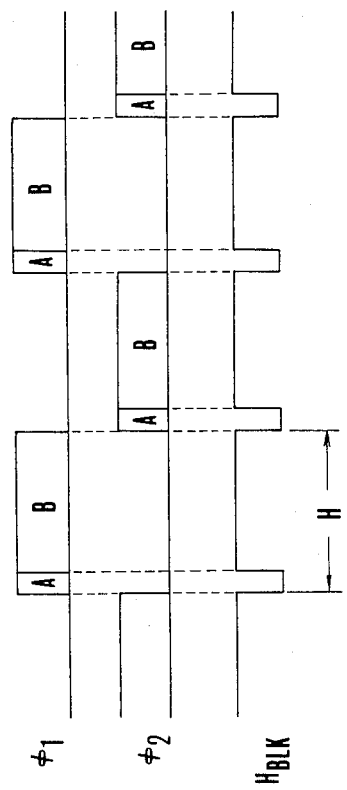
FIG. 4b is a chart illustrating the control timing by a controller 15'.

As shown in FIG. 4b, of the pulses $\phi_1$ and $\phi_2$, A is the writing-in period, and B is the reading-out period. Also, $H_{BLK}$ is horizontal blanking pulses, and the period of low level represents the horizontal blanking period.

Next, the operation will be explained. The pulses $\phi_1$ and $\phi_2$ cause the memories 10 and 11 respectively to memorize the level of the line-sequence signal of the horizontal blanking period alternatively. Also, this memorized level is read out repeatedly until the start of the next horizontal blanking period. Also, the writing-in is performed once for every 2H (horizontal period) by the pulses $\phi_1$ and $\phi_2$.

Therefore, the color difference line-sequence signal converted to a digital signal by the A/D converter is applied to the subtractor 13 where the offset level detected by the memory 10, 11 is subtracted therefrom. After that, it is returned to the analog signal by the D/A converter and an offset-free color difference line-sequence signal such as that shown in FIG. 1b is outputted.

Thus, according to the present invention, merits are produced that the offset removal can be stably carried out and that the circuit structure may be relatively simple.

Also, though this embodiment has been described as the color difference signal of the still video apparatus, it is to be understood that the present invention is applicable to the SECAM type color difference signal processing apparatus.

What is claimed is:

1. An offset removing device comprising:
   (a) input means for inputting a color differnece line-sequence signal with diverse parts, each having a difference offset level during each horizontal period thereof;
   (b) detecting means for detecting the level during the horizontal blanking period of the signal inputting thereto by said input means and generating an output signal indicative of such different offset levels during altenate cycles of said line-sequence signal; and
   (c) computing means for subtracting the output signal of said detecting means from the color difference line-sequence signal inputted by said input means.

2. A device according to claim 1, wherein said detecting means includes a sample-hold circuit.

3. A device according to claim 1, wherein said detecting means includes a memory.

4. A device according to claim 3, wherein said memory includes a digital memory.

5. A device according to claim 1, wherein said computing means includes an adder.

6. A device according to claim 1, wherein said computing means includes a subtractor.

7. A device according to claim 1, wherein said detecting means includes memory means for respectively detecting the offset level during each horizontal blanking period of one such part of the color difference line-sequence signal.

8. Apparatus for processing a color difference line-sequence signal comprising:
   (a) two memory means for memorizing the respective levels during a horizontal blanking period of said color difference line-sequence signal and generating output signals indicative thereof; and
   (b) computing means for selectively substracting said output signals of said two memory means from the color difference line-sequence signal.

9. An apparatus according to claim 8, wherein said memory means include sample-hold circuits.

10. An apparatus according to claim 8, wherein said memory heans include digital memories.

11. An apparatus according to claim 8, further comprising switching means for applying one of the output signals of said two memory means to said computing means in each horizontal peirod.

* * * * *